United States Patent [19]
De Korte et al.

[11] Patent Number: 5,822,776
[45] Date of Patent: Oct. 13, 1998

[54] MULTIPLEXED RANDOM ACCESS MEMORY WITH TIME DIVISION MULTIPLEXING THROUGH A SINGLE READ/WRITE PORT

[75] Inventors: Elizias De Korte, Kanata; David Cayer, Calgary, both of Canada

[73] Assignee: Mitel Corporation, Kanata, Canada

[21] Appl. No.: 613,519

[22] Filed: Mar. 11, 1996

[51] Int. Cl.$^6$ ................................................. G06F 13/20
[52] U.S. Cl. ..................... 711/167; 711/211; 395/287; 395/878; 395/894
[58] Field of Search ......................... 370/438; 395/865, 395/872, 297, 476, 494, 287, 878, 894, 728; 711/211

[56] References Cited

U.S. PATENT DOCUMENTS

| | | |
|---|---|---|
| 3,828,320 | 8/1974 | Dinerman et al. |
| 4,164,787 | 8/1979 | Aranguren. |
| 4,539,656 | 9/1985 | Abrant. |
| 4,562,572 | 12/1985 | Goldman et al. ..................... 370/329 |
| 4,837,785 | 6/1989 | McAlpine ............................. 370/438 |

*Primary Examiner*—Tod R. Swann
*Assistant Examiner*—J. Peikari
*Attorney, Agent, or Firm*—Pascal & Associates

[57] ABSTRACT

A multiported random access memory (RAM) system comprising a RAM having a data port and an address and control port, plural data buffers each having a bidirectional input port and a bidirectional output port, a data bus connecting the output ports of the data buffers and the data port of the RAM, a multiplexer having plural address and control inputs and an address and control output, the address and control output being connected to the address and control port of the RAM, each of the address and control inputs for receiving address and control data associated with data stored in a specific buffer, a timing apparatus connected to each of the buffers and to a control input of the multiplexer for separately enabling the multiplexer to pass address and control data therethrough to the address and control port of the RAM or to receive data from the data port of the RAM, whereby the bidirectional data input ports of the buffers and each of the corresponding address and control input ports forms a separate time shared port to the RAM.

12 Claims, 4 Drawing Sheets

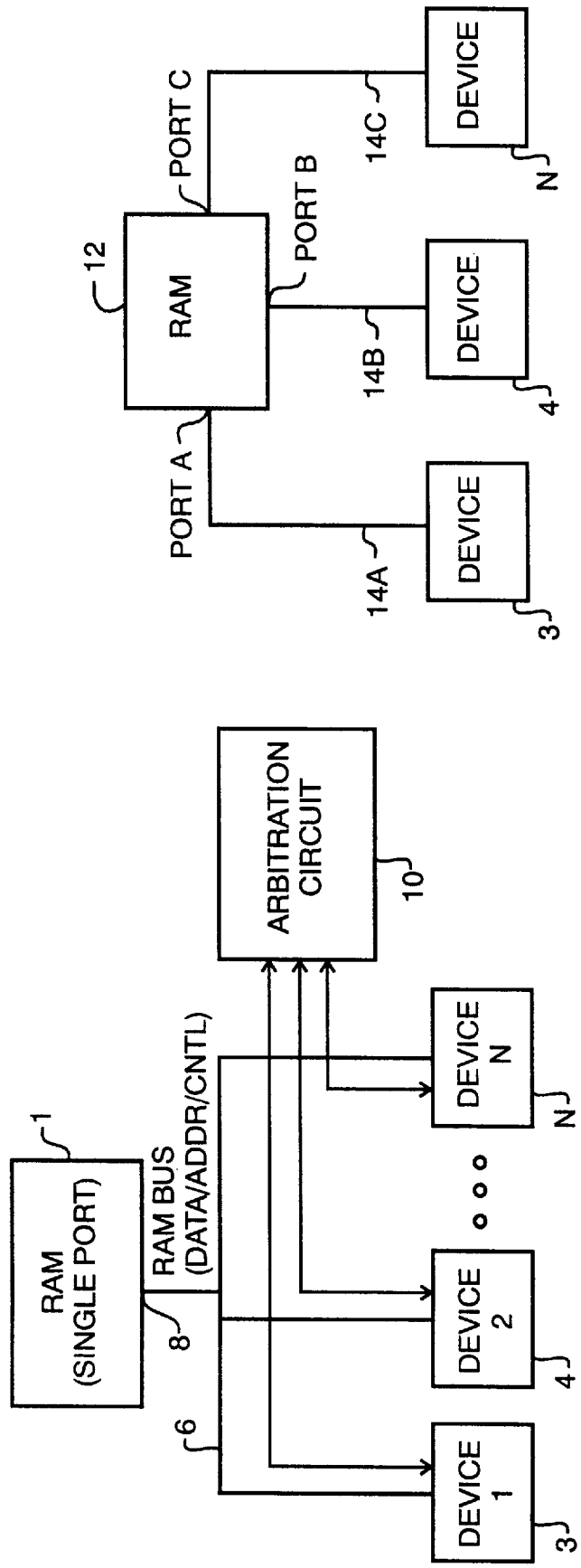
PRIOR ART
FIG. 2
PRIOR ART
FIG. 1

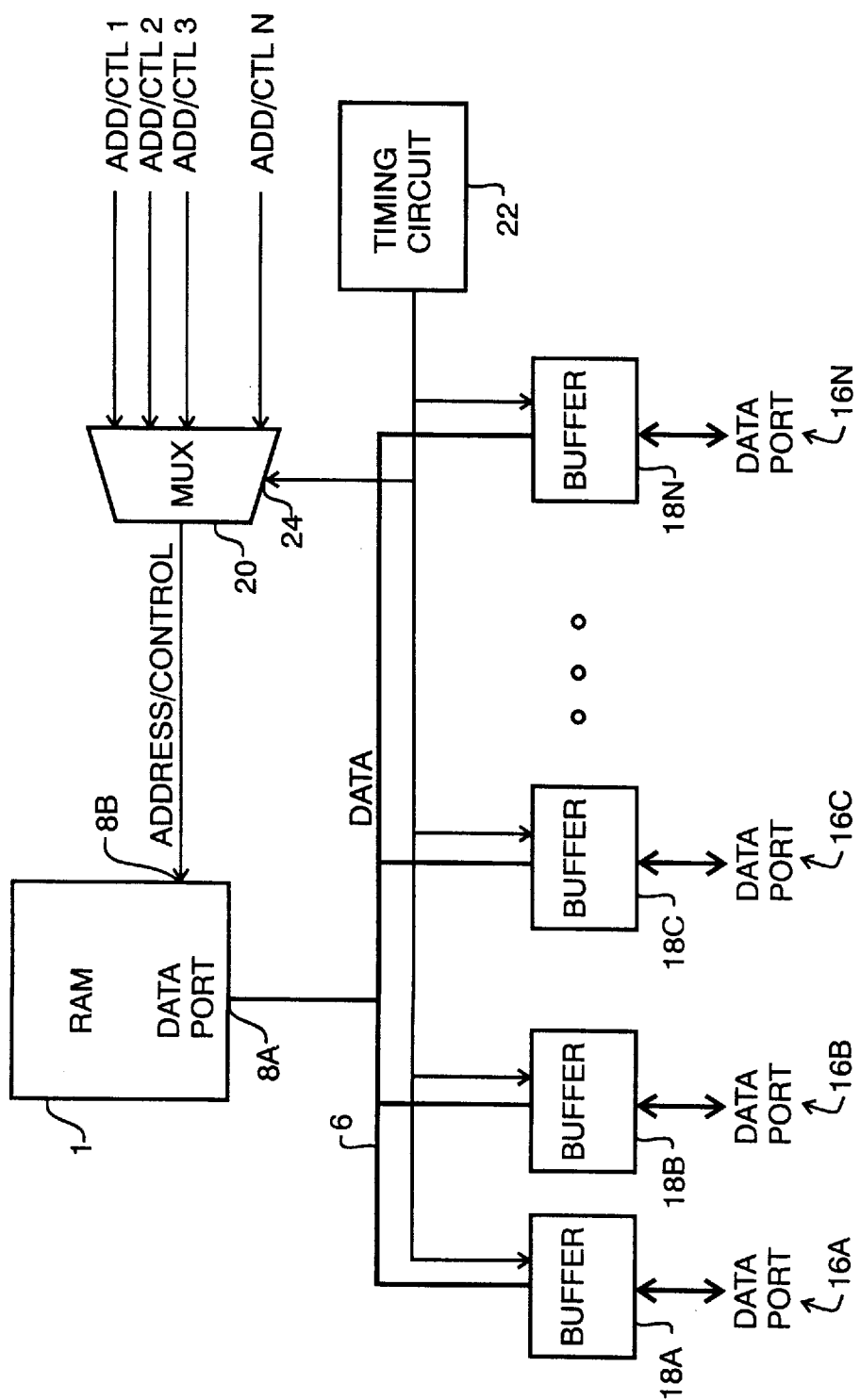
FIG. 3

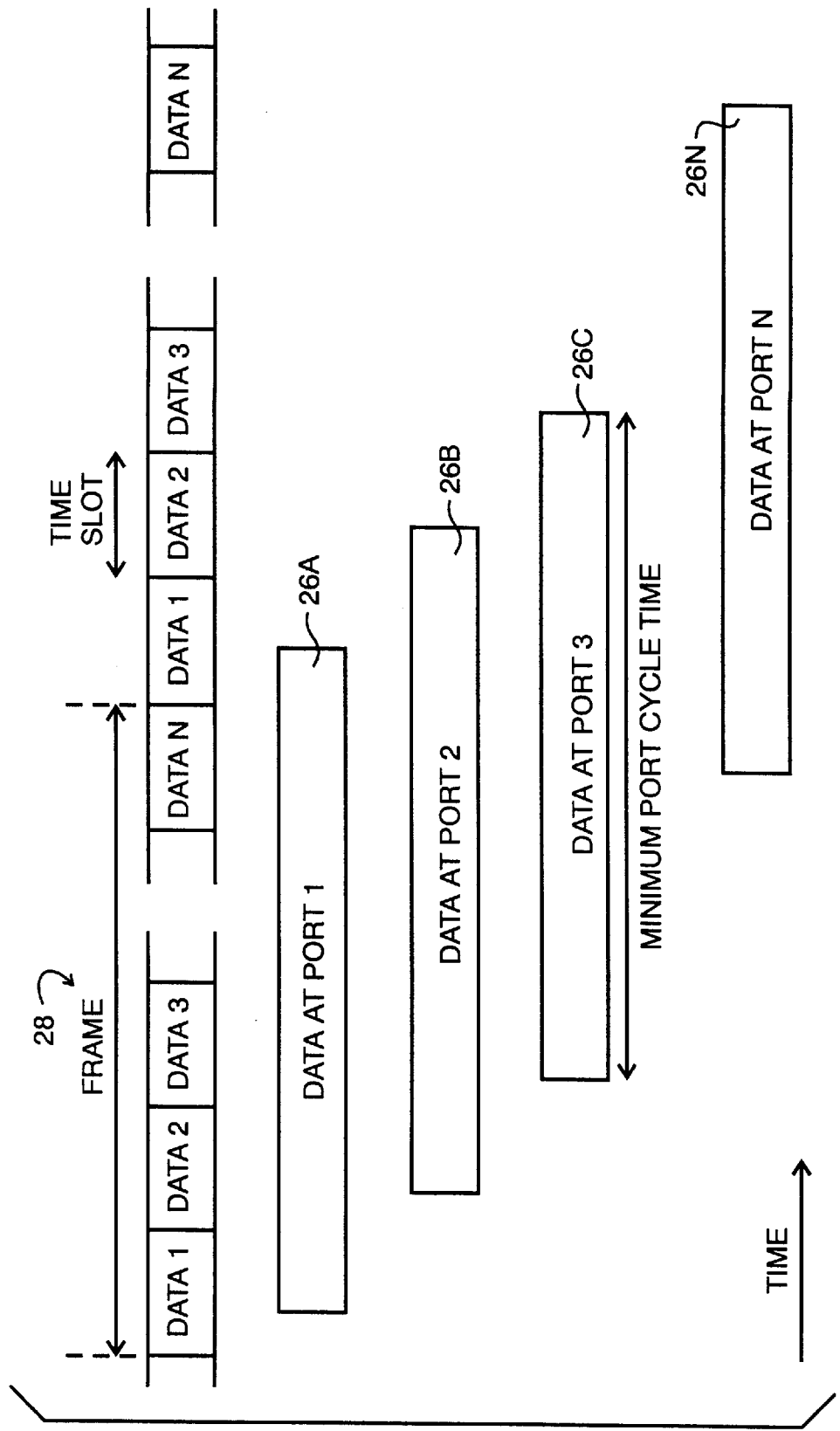
FIG. 4

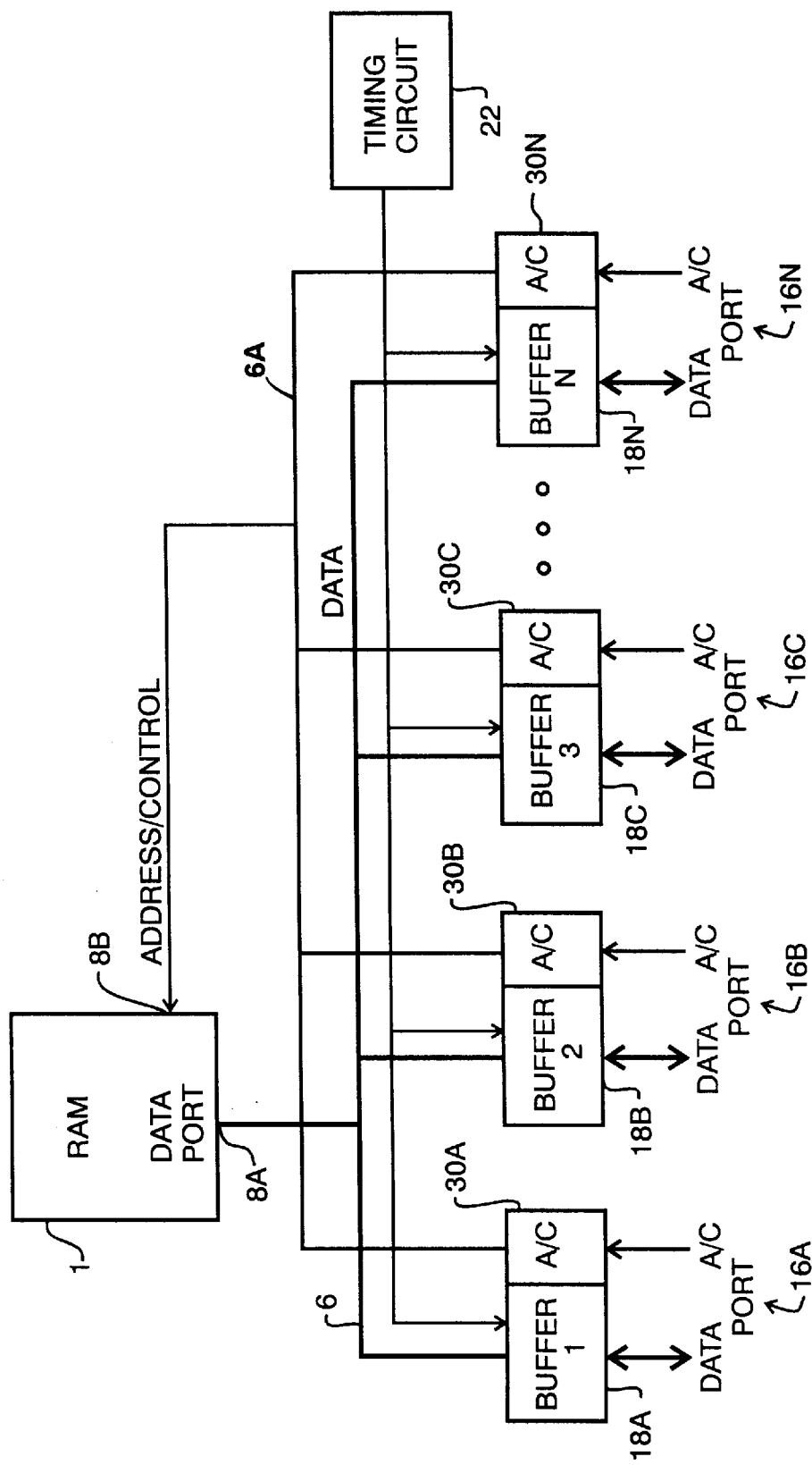
FIG. 5

MULTIPLEXED RANDOM ACCESS MEMORY WITH TIME DIVISION MULTIPLEXING THROUGH A SINGLE READ/WRITE PORT

FIELD OF THE INVENTION

This invention relates to the field of random access memories and in particular to a structure and method for data transfer to a random access memory which has limited port capacity.

BACKGROUND TO THE INVENTION

Random access memories (RAMS) are typically of the type which have a single port or have multiple ports. The term port in this context is meant to mean terminals which will receive output data, will receive an address, and will receive control signals, and are typically connected to a RAM bus. Multiple ports with independent access are required when a number of devices or subsystems must have immediate access to a single RAM without having to wait for arbitration.

Access using arbitration is used in order to control multiple inputs or outputs to a single port. When arbitration is used, one device has access to the RAM, but other devices must wait until the one device has finished its access to the RAM. Thus each device that does not have access must wait, since each device must request access, be granted access, then must use and release the RAM bus before other devices can use it.

FIG. 1 illustrates a single port RAM 1. Devices 3, 4 . . . n are connected via a RAM bus 6 to the port 8 of the RAM 1. An arbitration circuit 10 is connected to each of the devices 3, 4, . . . n and controls its access to the RAM bus. In this manner plural devices can obtain access to the single port 8 of the RAM, one at a time. As noted earlier, there is a considerable waiting time for each device, since when one of the devices has use of the bus 6, the port 8 and thus the RAM 1, all of the other devices are locked out and must wait until the one device is finished. Thus this system cannot be used where immediate access to the RAM is required.

FIG. 2 illustrates a multiple port RAM 12, e.g. having triple ports shown as port A, port B and port C. Each device 3, 4, . . . n is connected to a dedicated port by means of a separate bus 14A, 14B, 14C. In the state of the art, two-port RAMs are common, triple port RAMs are available, and four-port RAMs are rare. With each extra port, the cost of the integrated circuit increases because the full bus input-output terminals with associated signal drivers, etc., must be replicated for each port.

The prior art thus only allows multiple access of devices to a port by arbitration, whereby immediate access cannot be provided, or by the use of a multiple port RAM, which for several ports is either costly or unavailable.

SUMMARY OF THE INVENTION

The present invention provides multiple device access to a single read/write data port without requiring arbitration. Virtually immediate access is provided, and multiple buses and RAM multiple bus driving circuitry and terminals are not required. The number of ports that can be offered for connection to devices is not limited except by required speed of operation or storage capacity of the RAM.

Briefly, the present invention time shares the data port of the RAM between signals from and for plural devices. Since each device provides or buffers store data for a particular time period which is equal to a frame of data, the time allocated to one device is 1/n of the frame time, wherein n is equal to the number of devices which will use the port.

While the embodiments described or defined in this specification relate to a single port, it is intended that the single port can be part of a single port RAM, or one of the ports of a multiple data port RAM. In the latter case, one or plural ones of the multiple port RAM can be time-shared as described herein. However time sharing of only one port will be described for simplicity and ease of understanding of the invention.

In accordance with an embodiment of the invention, a multiported random access memory (RAM) system is comprised a RAM having a data port and an address and control port, plural data buffers each having a bidirectional input port and a bidirectional output port, a data bus connecting the output ports of the data buffers and the data port of the RAM, a multiplexer having plural address and control inputs and an address and control output, the address and control output being connected to the address and control port of the RAM, each of the address and control inputs of the multiplexer for receiving address and control data associated with data stored in a specific buffer, a timing means connected to each of the buffers and to a control input of the multiplexer for separately enabling the multiplexer to pass address and control data therethrough to the address and control port of the RAM, at the same time enabling a corresponding buffer to output data via its bidirectional output port that may be stored therein to the date port of the RAM, or to receive data from the data port of the RAM, whereby the bidirectional data input ports of the buffers and each of the corresponding address and control input ports form a separate time shared port to the RAM.

In accordance with another embodiment, a multiplexed random access memory (RAM) system is comprised of a RAM having a data port and an address and control port, plural buffers, each comprising a bidirectional data input port and a bidirectional data output port, an address and control input port and an address and control output port, means for latching address and control signals received via the address and control input ports of the buffer, the bidirectional data output ports of the buffers being connected to the data port of the RAM, the address and control output ports of the buffers being connected to the address and control port of the RAM, a timing means connected to each of the buffers for generating a cyclic count signal and thereby enabling each buffer in sequence to release latched addresses and control signals and data stored therein to the address and control input and to the data port respectively of the RAM, whereby the bidirectional data input ports of the buffers and each of the corresponding address and control input ports forms a separate time shared port to the RAM.

In accordance with another embodiment a multiplexed random access memory (RAM) is comprised of a RAM having a data port and an address and control port, plural data storing means connected to the data port, and means for addressing the RAM and for controlling the inputting or outputting of data to or from each of said plural data storing means in a sequential manner to or from separately addressed RAM memory locations.

In accordance with another embodiment, a method of operating a random access memory (RAM) having a data port and an address and control port is comprised of the steps of providing a sequence of different address and control signals to the address and control port of the RAM for sequentially addressing different storage locations of the RAM, and inputting or receiving data relating to plural data ports, to or from the data port of the RAM, whereby storage or retrieval of data to or from the data port of the RAM is time shared.

BRIEF DESCRIPTION OF THE DRAWINGS

A better understanding of the invention will be obtained by reading the description of the invention below, with reference to the following drawings, in which:

FIG. 1 and FIG. 2 are block diagrams of prior art multiple access systems,

FIG. 3 is a block diagram of an embodiment of the invention,

FIG. 4 is a timing diagram used to illustrate signal intervals during time division of a RAM port, and FIG. 5 is a block diagram of another embodiment of the invention.

DETAILED DESCRIPTION OF THE PREFERRED EMBODIMENTS

FIG. 3 illustrates a RAM 1 having a single port 8. In this Figure, the port has been divided into a data port portion 8A and an address and control port portion 8B, each of which will be referred to below as a port.

Separate external data ports 16A, 16B, . . . 16N to which devices which will share access to the RAM are connected to bidirectional input ports of respective buffers 18A, 18B, . . . 18N. Outputs of each of the buffers are connected to the data bus 6 of the RAM, whereby data can be transferred to and from the data port 8A of the RAM.

Each buffer is preferably comprised of a bus transceiver with latches in both transmission directions. Write data is stored in the buffer until the timeslot corresponding to its port allow data to be written in the RAM. During a read operation, data is latched from the data port 8A of the RAM into the addressed buffer during its timeslot.

Address and control inputs for each of the input ports are connected to respective inputs of a multiplexer 20. The output port of the multiplexer is connected to the address and control port 8B of the RAM 1.

A timing circuit 22 is connected to the control port 24 of the multiplexer 20, and to address inputs of the buffers. The timing circuit preferably cyclically counts sequentially, and outputs cyclically repeating binary count signals. These signals are used as a control signal to multiplexer 20 whereby the address and control signals appearing at respective inputs to the multiplexer are sequentially applied to its output, and therefore to the address and control port 8B of the RAM 1. As a result, with each address and control signal that appears at port 8B, a different memory location in RAM 1 is accessed, with cyclic repetition.

The binary count signals are also applied to address inputs of all of the buffers 18A–18n. When the binary count signal coincides with the address of a particular buffer, it is enabled, connecting it to bus 6 and therefore to data port 8A. Depending on whether a control signal applied to address and control port 8B is a write enable or a read enable signal, data is either accepted from the addressed buffer by the RAM data port 8A, or is output from the data port 8A to the addressed buffer.

It should be noted that other forms of timing circuit can be used, for example one which outputs specific address signals to the buffers rather than a simple binary count signal, or one which outputs a different control signal to the control input of multiplexer 20 than the address signals sent to the buffers.

FIG. 4 illustrates the timing of signals which pass through the invention. Data from each of the devices appears at the various ports 18A, 18B, 18C, for example, which are shown as data blocks 26A, 26B, 26C . . . 26n and is stored in a corresponding buffer. The interval of the data extends for the period of the block shown as the minimum port cycle time. Address and control signals relating to each data block appear at the input of the multiplexer 20 for the same interval as the data block.

A frame 28 is defined in which the data from each of the buffers is sequentially applied to the data port 8A, or during which data from the data port 8A is applied to the buffers. As shown in FIG. 4, the number of time slots in the frame is equal to the frame time divided by the number of devices, i.e. the number of data ports 16A–16n.

The maximum number of ports is determined by the RAM access time, the speed of the timing circuit and the port cycle time, as well as the capacity of the RAM. Each time slot is at least as large as a longest cycle time of one of the data, address and control port of the RAM. The speed of the timing circuit translates into a specific time allocated for each time slot. That speed and the RAM access time should be fast enough to accommodate the minimum port cycle time.

Thus during each successive frame, data stored in each buffer in sequence is read into the RAM via its data port 8A during its allocated time slot. Alternatively, during each successive frame, data from data port 8A is read into each buffer in sequence during its allocated time slot.

It should also be noted that each time slot can be used either in a read or write operation, depending on whether a control signal applied to address and control port 8B is a write or a read enable signal. Thus during a frame the time slots need not be dedicated to either a read or write operation.

FIG. 5 illustrates another embodiment of the invention. In this case an address and control signal latch circuit 30A, 30B, . . . 30n is connected to each respective buffer. The outputs of each latch are connected to the address and control port 8B of the RAM, via bus 6A. Timing circuit 22 is connected to address inputs of the buffers.

In operation, data associated with each data port 16A, 16B, . . . 16n applied to those respective data ports, and is stored in the corresponding buffers 18A, 18B, . . . 18N. At the same time, the address and control signals associated with each of those ports are applied to the inputs of the respective address and control signal latch circuits and are latched thereby.

Timing circuit 22 outputs a cyclic count or address signal to the buffers 18A–18N, which are enabled thereby. The latch circuit 30A, 30B–30N associated with the addressed buffer is also enabled by connection to the buffer being addressed and thus enabled. As a result, during the time that each buffer is enabled in sequence as controlled by the timing circuit 22, the data port 8A is connected to the addressed buffer for a write or read operation as described earlier.

Further, since the latch associated with the enabled buffer is also enabled, its stored address and control signals are output to the address and control port 8B of the RAM 1. The corresponding memory location is thereby addressed, and the RAM is controlled to write to or read from the data port 8A, during each time slot of a frame. The timing is similar to that described with reference to FIG. 4.

In this embodiment therefore each port 16A–16N has time shared access to the RAM 1 during sequential time slots controlled by timing circuit 22, without the use of a multiplexer as in the embodiment of FIG. 3.

Each latch circuit preferably has a memory function that will allow one write only after a "write command" is latched. This memory function is to prevent "posted writes" from occurring repeatedly, for every frame. This memory function may apply to read functions also, but is not mandatory.

In both of the embodiments described above, an immediate requirement of a device for access to the RAM is delayed only by time slot time, which is 1/n of a frame. Since the devices would normally operate on a frame timing basis, devices requiring immediate access would not realize that immediate access to the RAM is not available.

A person understanding this invention may now conceive of alternative structures and embodiments or variations of the above. All of those which fall within the scope of the claims appended hereto are considered to be part of the present invention.

We claim:

1. A multiported random access memory (RAM) system comprising:
   (a) a RAM having a single read/write data port, and an address and control port,
   (b) plural data buffers each having a bidirectional input port and a bidirectional output port,
   (c) a data bus directly connecting the bidirectional output ports of said data buffers to said data port of said RAM,
   (d) a multiplexer having plural address and control inputs and an address and control output, the address and control output of said multiplexer being directly connected to the address and control port of the RAM, each of the address and control inputs of said multiplexer for receiving address and control data associated with a specific data buffer,
   (e) a timing means connected to each of the buffers and to a control input of the multiplexer for separately enabling the multiplexer to pass address and control data therethrough to the address and control port of the RAM, at the same time enabling a predetermined buffer to output data via its bidirectional output port that may be stored therein to the data port of the RAM, or to receive data from the data port of the RAM,
   whereby the bidirectional data input ports of the buffers and each of the corresponding address and control input ports forms a separate time shared port to the RAM.

2. A RAM system as defined in claim 1 wherein the output signal of the timing circuit is a binary signal comprising a cycling count whereby the multiplexer is controlled thereby in sequence to pass address and control data from each of its inputs in sequence to its address and control output, and wherein each of the buffers is controlled in sequence to output or receive data via its bidirectional output port.

3. A RAM system as defined in claim 2 wherein a cycle time of said count defines a frame having an interval which is equal to the number of buffers multiplied by a time slot, each time slot being a time period which is at least as long as a longest cycle time of either the data, or the address and control port of the RAM.

4. A multiplexed random access memory (RAM) system comprising:
   (a) a RAM having a single read/write data port and an address and control port,
   (b) plural buffers, each comprising a bidirectional data input port and a bidirectional data output port, an address and control input port and an address and control output port,
   (c) means for latching address and control signals received via the address and control input ports of the buffer,
   (d) the bidirectional data output ports of the buffers being connected to the address and control port of the RAM,
   (e) a timing means connected to each of the buffers for generating a cyclic count signal and thereby enabling each buffer in sequence to release latched addresses and control signals and data stored therein to the address and control input and to the data port respectively of the RAM,
   whereby the bidirectional data input ports of the buffers and each of the corresponding address and control input ports form a separate time shared port to the RAM.

5. A RAM system as defined in claim 4 wherein a cycle time of said cyclic count signal defines a frame having an interval which is equal to the number of buffers multiplied by a time slot, each time slot being a time period which is at least as long as a longest cycle time of either the data, or address and control port of the RAM.

6. A multiplexed random access memory (RAM) comprising:
   (a) a RAM having a single read/write data port and an address and control port,
   (b) plural data storing means connected to the data port, and
   (c) means for addressing the RAM and for controlling the inputting or outputting of data to or from each of said plural data storing means in a sequential manner to or from separately addressed RAM memory locations,
   said addressing means being comprised of a multiplexer for receiving address and control signals each relating to data stored in a respective one of the data storing means and for applying one of the address and control signals to the RAM while enabling one of the plural data storing means to apply or receive data to or from the RAM.

7. A RAM as defined in claim 6 in which the addressing means is comprised of a plurality of latch means each associated with a data storing means for storing address and control signals relating to data stored in an associated data storing means, and means for enabling the data storing means and an associated latch means for applying one of the address and control signals and associated data stored in the data storing means to corresponding ports of the RAM.

8. A method of operating a random access memory (RAM) having a single read/write data port and an address and control port comprising the steps of providing a sequence of different address and control signals to the address and control port of the RAM for sequentially addressing different storage locations of the RAM, and inputting or receiving data relating to plural data ports, to or from the data port of the RAM, whereby storage or retrieval of data to or from the data port of the RAM is time shared.

9. A method as defined in claim 8 including providing said sequence of different address and control signals through a multiplexer and controlling the multiplexer in time with said inputting to, or receiving data from the data port of the RAM.

10. A method as defined in claim 8 including storing each address and associated control signals in a latch means, and enabling each latch means in sequence and in time with said inputting or receiving data from the data port of the RAM.

11. A method as defined in claim 9 including storing data relating to said plural data ports in separate buffers, bidirectional data input ports of said buffers each forming a data port with access to the RAM data port time shared with other bidirectional data input ports.

12. A method as defined in claim 10 including storing data relating to said plural data ports in separate buffers, each buffer being associated with a corresponding said latch means, bidirectional data input ports of said buffers each forming a data port with access to the RAM data port time shared with other bidirectional data input ports.

* * * * *